US011913274B2

(12) United States Patent
Zimmer et al.

(10) Patent No.: US 11,913,274 B2
(45) Date of Patent: Feb. 27, 2024

(54) SLIDING-DOOR SYSTEM

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

( * ) Notice: Subject to any disclaimer, the term of this patent is extended or adjusted under 35 U.S.C. 154(b) by 47 days.

(21) Appl. No.: 17/783,474

(22) PCT Filed: Dec. 8, 2020

(86) PCT No.: PCT/DE2020/000327
§ 371 (c)(1),
(2) Date: Aug. 12, 2022

(87) PCT Pub. No.: WO2021/115515
PCT Pub. Date: Jun. 17, 2021

(65) Prior Publication Data

US 2023/0147793 A1 May 11, 2023

(30) Foreign Application Priority Data

Dec. 10, 2019 (DE) ..................... 10 2019 008 572.8

(51) Int. Cl.
*E05D 15/06* (2006.01)
*E05F 1/16* (2006.01)
*E05F 3/10* (2006.01)

(52) U.S. Cl.
CPC .................. *E05F 3/10* (2013.01); *E05F 1/16* (2013.01); *E05Y 2201/232* (2013.01);
(Continued)

(58) Field of Classification Search
CPC .... E05F 3/10; E05F 1/16; E05F 5/003; E05Y 2201/232; E05Y 2201/256;
(Continued)

(56) References Cited

U.S. PATENT DOCUMENTS 8,402,606 B1 * 3/2013 Tsai ........................ E05F 5/003 16/49
9,435,152 B2 * 9/2016 Zimmer .................. E05F 5/003
(Continued)

FOREIGN PATENT DOCUMENTS

DE 102011115662 B4 * 4/2013 .............. E05F 5/003
DE 102017010876 A1 5/2019
(Continued)

*Primary Examiner* — Jerry E Redman
(74) *Attorney, Agent, or Firm* — Smartpat PLC

(57) ABSTRACT

A sliding door system includes a door frame and a sliding door leaf that can move relative thereto. A catch is arranged either on the door frame or on the sliding door leaf, which can be coupled to a drive element of a feed device arranged on the respective other component. The feed device has a spring energy store and a cylinder-piston unit. The cylinder-piston unit has a piston that separates a displacement chamber from a compensation chamber. A passage cross-section between the displacement chamber and the compensation chamber can be changed in a load-dependent manner by a piston disk that can be applied at a piston end side. The tension force of the tension spring of a minimal effective length is between 1.5 and 3.5 times the total static friction force of the sliding door leaf and the resistance of the cylinder-piston unit at the maximum passage cross-section.

9 Claims, 4 Drawing Sheets

(52) U.S. Cl.
CPC ... *E05Y 2201/256* (2013.01); *E05Y 2201/488* (2013.01); *E05Y 2600/46* (2013.01); *E05Y 2800/24* (2013.01); *E05Y 2900/132* (2013.01); *E05Y 2900/20* (2013.01)

(58) Field of Classification Search
CPC ........... E05Y 2201/488; E05Y 2600/46; E05Y 2800/24; E05Y 2900/132; E05Y 2900/20
See application file for complete search history.

(56) References Cited

U.S. PATENT DOCUMENTS

| | | | | |
|---|---|---|---|---|
| 9,765,559 | B2 * | 9/2017 | Shin | E05F 3/00 |
| 9,863,178 | B2 * | 1/2018 | Wang | E05F 5/027 |
| 10,273,743 | B2 * | 4/2019 | Gosling | E05F 5/003 |
| 2010/0007254 | A1 | 1/2010 | Zimmer et al. | |
| 2010/0043172 | A1 * | 2/2010 | Nezu | E05F 5/003<br>16/82 |
| 2011/0023370 | A1 * | 2/2011 | Zimmer | E05F 1/16<br>49/360 |
| 2016/0340955 | A1 | 11/2016 | Zimmer et al. | |
| 2020/0347837 | A1 | 11/2020 | Zimmer et al. | |

FOREIGN PATENT DOCUMENTS

| | | | | | |
|---|---|---|---|---|---|
| DE | 102018004643 | A1 | * | 12/2019 | E05F 1/16 |
| DE | 212019000364 | U1 | * | 5/2021 | E05F 1/16 |
| EP | 2120645 | A1 | | 11/2009 | |
| EP | 3070248 | B1 | | 3/2018 | |
| EP | 2472140 | B1 | | 7/2019 | |
| KR | 20180050114 | A | * | 5/2018 | |
| WO | WO-2010043334 | A1 | * | 4/2010 | A47B 88/467 |
| WO | WO-2012107029 | A2 | * | 8/2012 | E05F 1/16 |
| WO | WO-2018185311 | A1 | * | 10/2018 | A47B 88/46 |
| WO | WO-2020078496 | A1 | * | 4/2020 | E05F 1/16 |

* cited by examiner

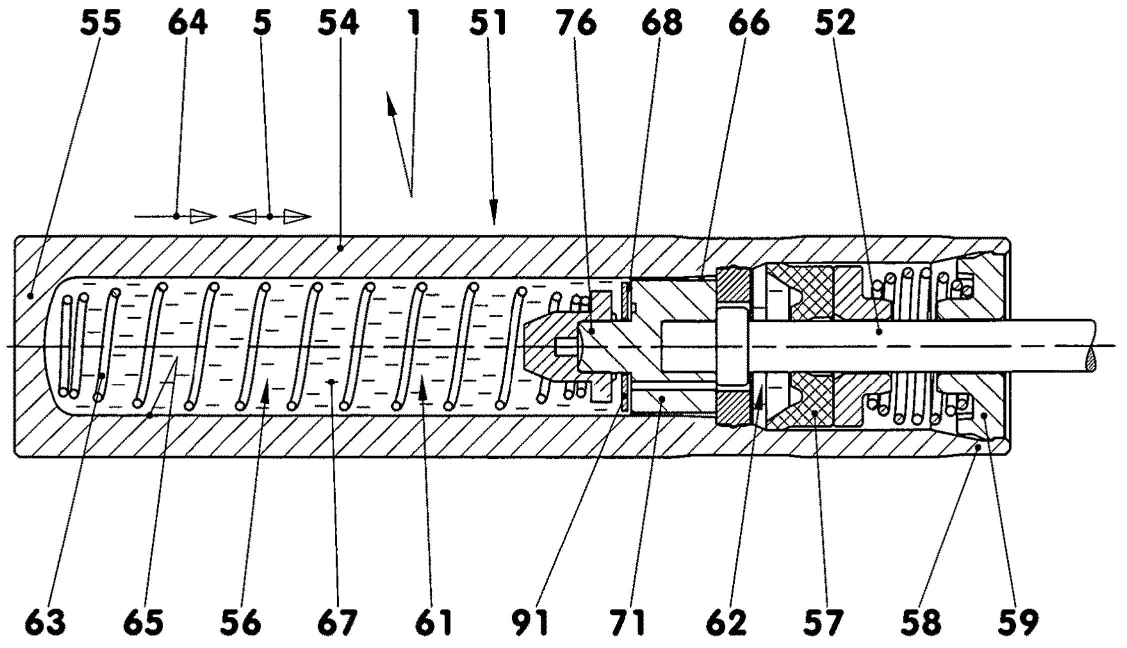
Fig. 5
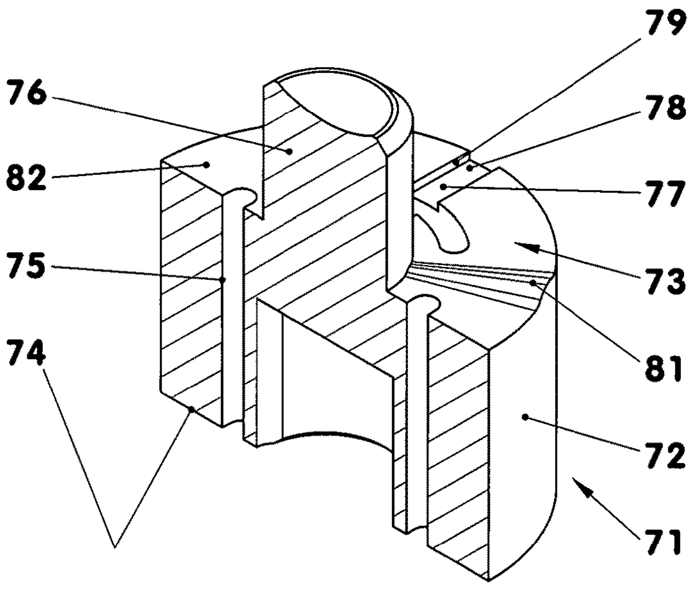
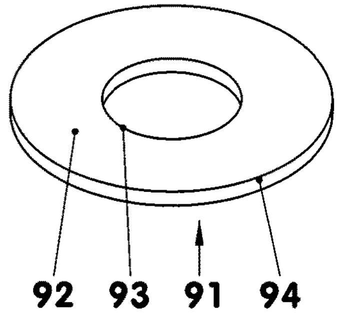
Fig. 7
Fig. 6

SLIDING-DOOR SYSTEM

TECHNICAL FIELD

The disclosure relates to a sliding door system with a door frame and at least one sliding door leaf that can move relative to the door frame between an open end position and a closed end position along a door guide rail.

BACKGROUND

A sliding door system is generally known from EP 2 472 140 A1. When opening the sliding door, the operator must overcome the feeding force of the spring.

SUMMARY

The present disclosure is based on the problem of achieving the most uniform possible closing speed of a sliding door leaf and a low opening force of the sliding door leaf to be applied by the operator.

This problem is solved by a sliding door system with a door frame and at least one sliding door leaf that can move relative to the door frame between an open end position and a closed end position along a door guide rail. A catch is arranged either on the door frame or on the sliding door leaf, which catch can be coupled to a drive element, arranged on the other component in each case, of a feed device in a partial stroke range of the sliding door adjacent to one of the specified end positions, so that the feed device conveys the sliding door leaf relative to the door frame into this end position. The feed device has a spring energy store forming an acceleration device and a deceleration device formed as a cylinder-piston unit. The cylinder-piston unit has a piston that can move relative to a cylinder and separates a displacement chamber from a compensation chamber, and wherein the passage cross-section between the displacement chamber and the compensation chamber can be changed in a load-dependent manner by means of a piston disk that can be applied against a piston end side on the displacement chamber side.

The minimum passage cross-section is between 0.5 percent and 4 percent of the internal cross-sectional area of the cylinder. The maximum passage cross-section is between 10% and 15% of the internal cross-sectional area of the cylinder. The spring energy store is designed as a tension spring whose tension force at the maximum effective length is between twice and three times the tension force at the minimum effective length. In addition, the tension force of the tension spring of a minimum effective length that is extended by a quarter of its effective stroke amounts to between 1.5 and 3.5 times the amount of the sum of the static frictional force of the sliding door leaf and the resistance of the cylinder-piston unit with a maximum passage cross-section.

The sliding door system has a speed-dependent throttle that decelerates the sliding door leaf. Thereby, the pressure in the displacement chamber decreases with decreasing velocity. In a threshold range of pressure, the deceleration effect is reduced to a minimum. Thereby, the passage cross-section between the displacement chamber and the compensation chamber is increased. The sliding door leaf is now conveyed to the end position by means of the tension spring. Thereby, the tension spring is designed to overcome the greater force from the static frictional force and the rolling frictional force of the sliding door leaf along with the resistance of the cylinder-piston unit with a maximum passage cross-section in such residual stroke.

BRIEF DESCRIPTION OF THE DRAWINGS

FIG. 5: Section of a cylinder-piston unit;
FIG. 6: Isometric sectional view of a piston;
FIG. 7: Piston disk.

DETAILED DESCRIPTION

Figure 1:
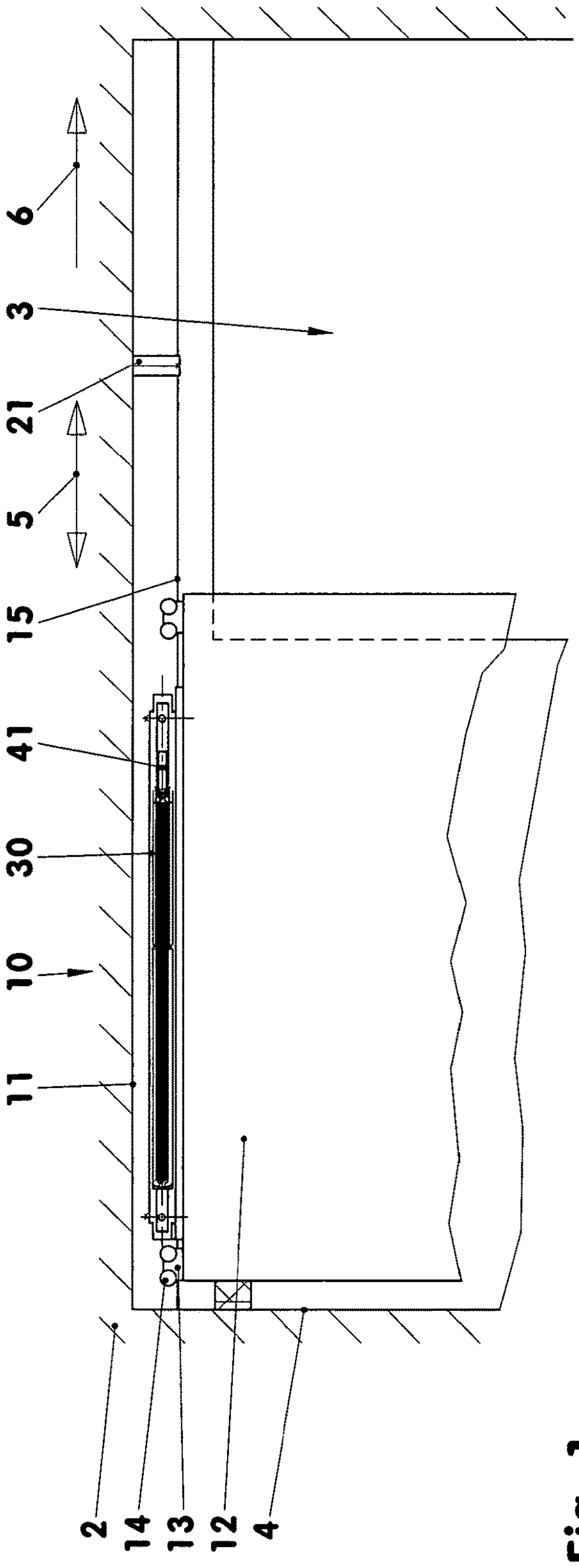
FIG. 1: Sliding door system, open.
Figure 2:
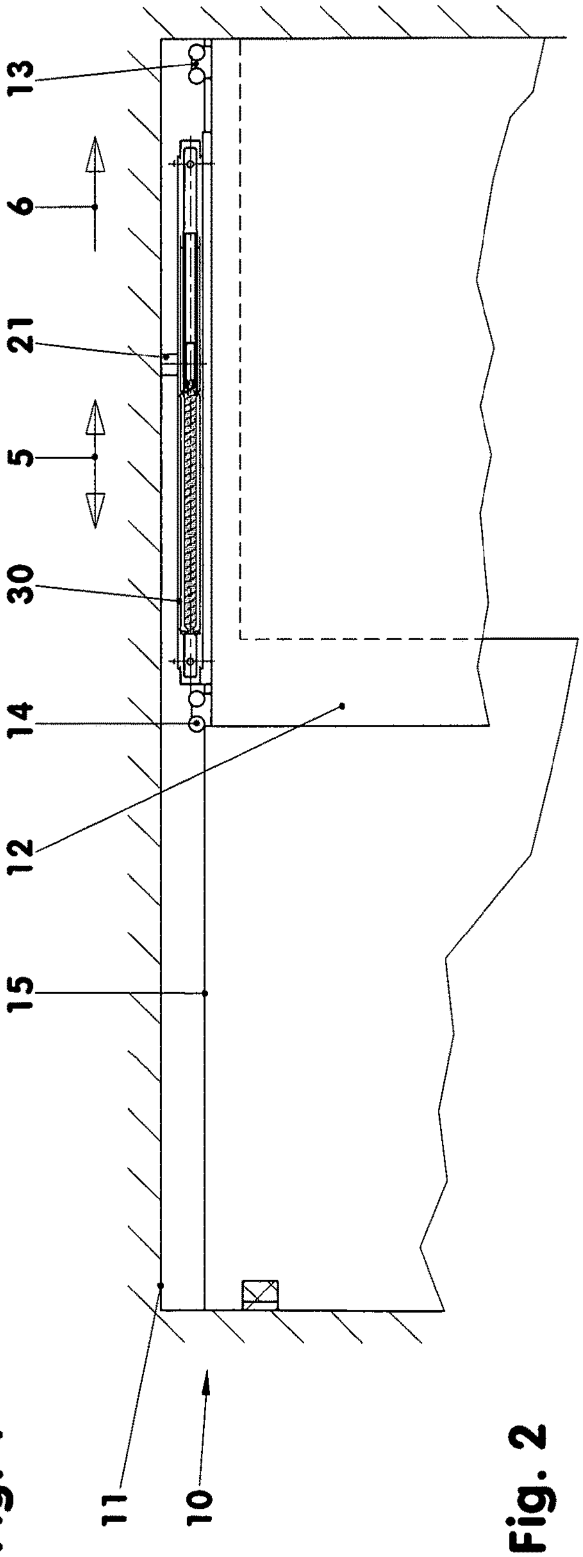
FIG. 2: Sliding door system, closed.

FIGS. 1 and 2 show a sliding door system (10) in an open position and in a closed position. Such sliding door system (10) can be arranged on a piece of furniture, used as a room divider, etc.

The sliding door system (10) has a door frame (11) arranged, for example, in the body (2) of the piece of furniture and delimiting a door opening (3), for example, on one or more sides. In the case of a door frame (11) arranged on one side, for example, this is arranged above a sliding door leaf (12) that can be moved between a closed position and an open position. In the closed position, see FIG. 2, the sliding door leaf (12) closes the door opening (3). In the open position shown in FIG. 1, the sliding door leaf (12) is located in a recess (4) on the wall side. However, it is also conceivable to move the sliding door leaf (12) next to a fixed door leaf during opening.

The sliding door leaf (12) is mounted in the door frame (11), for example, by means of roller shoes (13). Such roller shoes (13) have, for example, rollers (14) that can be moved along a guide rail (15) on anti-friction bearings. With a mass of the sliding door leaf (12) of 60 kilograms, for example, the coefficient of static friction of all rollers (14) is less than 0.0165. The drive force to be generated to move the unloaded sliding door leaf (12) away is thus less than 10 newtons, for example.

In the exemplary embodiment, a catch (21) is arranged in the door frame (11). The catch (21) is designed, for example, in the form of a pin and projects out of the door frame (11) in the direction of the sliding door leaf (12). A feed device (30) is fastened to the sliding door leaf (12). The feed device (30) has a drive element (41) that couples with the drive element (21), for example, in a partial stroke of the sliding door leaf (12) adjacent to the closed end position of the sliding door leaf (12). It is also conceivable to engage the feed device (30) before the open end position is reached. As soon as the sliding door leaf (12) is coupled to the door frame (11), it is moved by means of the feed device (30), for example into the closed end position. When the sliding door leaf (12) is opened, the feed device (30) is returned to its initial position and uncoupled from the catch (21). It is also conceivable to arrange the catch (21) on the sliding door leaf (12) and the feed device (30) on the door frame (11).

Figure 3:
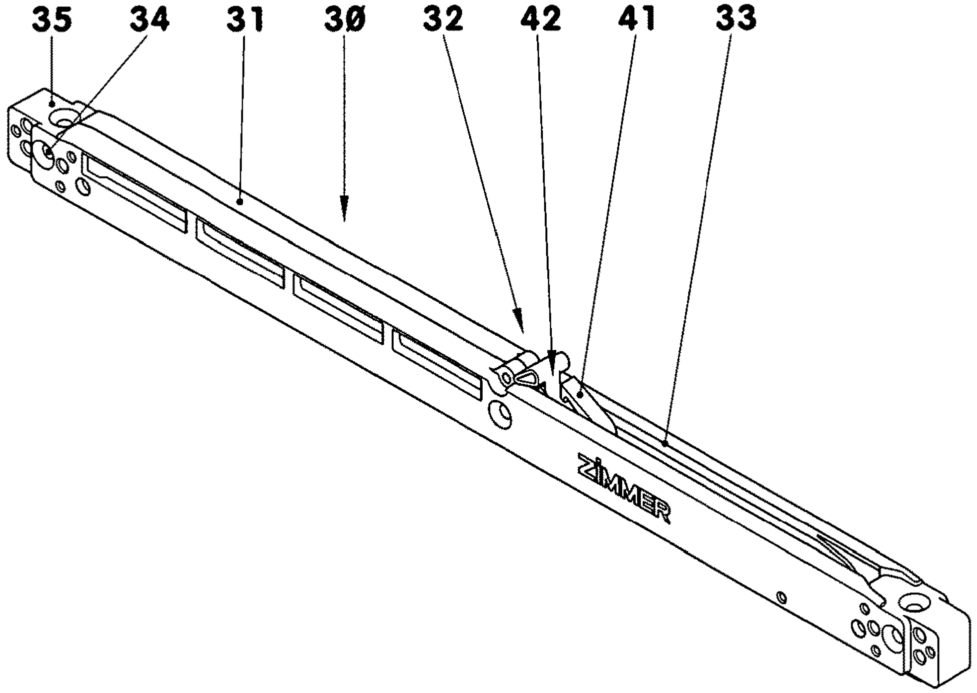
FIG. 3: Feed device.

FIG. 3 shows a feed device (30). The feed device (30) has, for example, a two-part housing (31) from which the drive element (41) projects. The drive element (41) can be displaced in the longitudinal direction (5) of the feed device (30) between an end position (32) shown in FIG. 3 and a parking position secured by a force fit and/or form fit, and back. The drive element (41) projects along the entire travel stroke through a longitudinal slot (33) of the housing (31).

The housing (31) further has, for example, two or more transverse apertures (34) for fastening the feed device (30) to, for example, the sliding door leaf (12).

Figure 4:
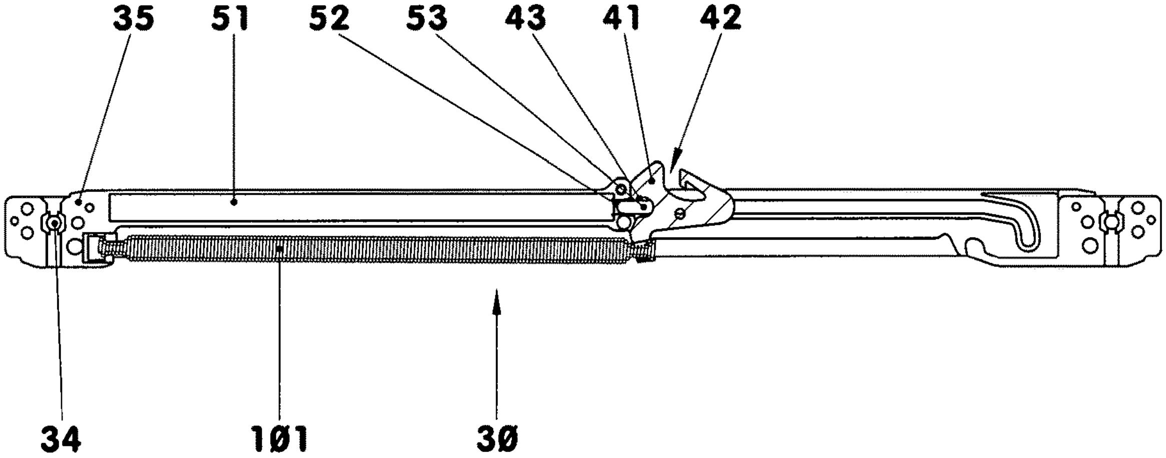
FIG. 4: Longitudinal section of the feed device shown in FIG. 3.

FIG. 4 shows a longitudinal section of the feed device (30) shown in FIG. 3. The drive element (41) has a receiving opening (42) for gripping around the catch (21). At its end pointing towards the rear of the housing (35), the drive element (41) has a piston rod holder (43). A piston rod head (53) of a piston rod (52) of a cylinder-piston unit (51) is held in this piston rod holder (43). Such cylinder-piston unit (51) forms a deceleration device (51). The cylinder (54) of the deceleration device (51) is fastened in the housing (31), for example. For example, such cylinder-piston unit (51) is designed for a maximum force of 300 newtons.

A spring energy store (101) is also held on the drive element (41) and on the housing (31). In the exemplary embodiment, this is connected in parallel with the deceleration device (51), so that the spring energy store (101) and the deceleration device (51) act simultaneously on the drive element (41) at least in a partial stroke. The spring energy store (101) is designed as a tension spring (101). In this exemplary embodiment, the tension spring (101) has a minimum effective length that is, for example, 30% greater than the relaxed length of the tension spring (101). In this exemplary embodiment, the maximum effective length of the tension spring (101) is 55% greater than the minimum effective length. The spring force at the maximum effective length of the tension spring (101) is 61 newtons in this exemplary embodiment. This is, for example, three times the spring force at the minimum effective length.

FIG. 5 shows a longitudinal section of a cylinder-piston unit (51). The cylinder-piston unit (51) comprises the cylinder (54) in which a piston (71) connected to the piston rod (52) can be moved in the longitudinal direction (5). In, for example, the oil-filled cylinder interior (56), the piston (71) separates a displacement chamber (61) from a compensation chamber (62). The compensation chamber (62) is delimited on the cylinder head side by means of a spring-loaded compensation sealing element (57). Such compensation sealing element (57) hermetically separates the compensation chamber (62) from the surrounding area (1).

At the cylinder head (58), the piston rod (52) passes through a cylinder head cover (59). If necessary, the piston rod (52) can be guided in the cylinder head cover (59).

A return spring (63) is arranged in the displacement chamber (61) between the piston (71) and the cylinder base (55). This return spring (63), designed as a compression spring (63), loads the piston (71) in the extension direction (64).

In the exemplary embodiment, the inner cylinder wall (65) is designed to be cylindrical. For example, it has a circular cross-section that is constant over the stroke length. However, the inner cylinder wall (65) can also be formed to be conical, stepped, etc. The usable stroke length of the cylinder-piston unit (51) corresponds, for example, to the travel distance of the drive element (41) between the parking position and the end position (32).

The piston (71) has the shape of a geometric cylinder. It has a cylindrical shell surface (72) formed as a cylinder shell delimited by two piston end sides (73, 74). In the exemplary embodiment, the cross-sectional area of the piston (71) in a plane normal to the longitudinal direction (5) is 97.5% of the internal cross-sectional area of the cylinder (54) in a plane parallel thereto. The inner cylinder wall (65) and the piston (71) thus delimit an annular gap (66).

FIG. 6 shows an isometric section of a piston (71). For example, the piston (71) has three longitudinal apertures (75) connecting the two piston end sides (73, 74). For example, all longitudinal apertures (75) have the same dimensions and are evenly distributed on a common pitch circle. In a view in a normal plane to the longitudinal direction (5), the single longitudinal aperture (75) has the shape of a curved elongated hole.

On the piston end side (73) facing the displacement chamber (61), the piston (71) carries a centrally arranged piston pin (76). In addition, such piston end side (73) on the displacement chamber side has, for example, at least one throttle channel (77) connecting one of the longitudinal apertures (75) to the piston shell surface (72). In the exemplary embodiment, the throttle channel (77), which has a sharp edge, for example, has a base surface (78) lying in a normal plane to the longitudinal direction (5). The side walls (79) are perpendicular to this. A V-shaped or U-shaped design of the throttle channel (77), for example, is also conceivable. In the exemplary embodiment, each of the longitudinal apertures (75) is connected to the piston shell surface (72) by means of a throttle channel (77).

The piston end side (73) on the displacement chamber side is designed to be uneven. For example, it has at least one elevation (81) oriented in the radial direction. This projects from the otherwise flat surface section (82) of the piston end side (73) on the displacement chamber side. The elevation (81) is designed to be wave-shaped, for example, so that it merges tangentially into the adjacent regions of the piston end side (73) on the displacement chamber side. The piston end side (73) can, for example, be designed in such a way that an elevation (81) is arranged between each two longitudinal apertures (75).

The piston pin (76) carries a piston disk (91); see FIG. 7. This is an annular disk (91) that is flat in its basic state and has two end faces (92) that are plane-parallel to one another and a central bore (93). In the exemplary embodiment, the inner diameter of the piston disk (91) is 10% larger than the outer diameter of the piston pin (76). The outer diameter of the piston disk (91) is, for example, 93% of the outer diameter of the piston (71). In the exemplary embodiment shown, the piston disk (91) has a thickness of 5.5% of the piston diameter. This is 0.3 millimeters, for example. In the exemplary embodiment, the piston disk is made of polyoxymethylene (POM). The modulus of elasticity of such material is, for example, 2800 megapascals. However, it is also conceivable to use materials with moduli of elasticity of up to 3500 megapascals.

After assembly of the sliding door system (10) with the feed device (30), the sliding door leaf (12) is in the open position, for example. The feed device (30) is arranged on the sliding door leaf (12), for example. It is in the parking position, in which the drive element (41) is secured with a force fit and/or form fit. The piston rod (52) of the cylinder-piston unit (51) is extended and the tension spring (101) is tensioned to its maximum effective length.

To close the sliding door leaf (12), the operator presses the sliding door leaf (12) in the closing direction (6). For example, the thrust speed ranges from 25 millimeters per second to 50 millimeters per second. In a partial range of the total stroke of the sliding door leaf (12) adjacent to the closed end position, the catch (21) couples with the drive element (41) of the feed device (30). The drive element (41) is released from the parking position and moves in the direction of the end position (32). Thereby, the cylinder-piston unit (51) is loaded. The piston (71) compresses the displacement chamber (61). For example, the pressure in the displacement chamber (61) increases to 70 newtons. Oil is displaced from the displacement chamber (61) through the annular gap (66) and through the throttle channels (77) into the compensation chamber (62). At the same time, the piston disk (91) is pressed against the piston end side (73) on the displacement chamber side. Thereby, all throttle channels (77) remain open. The annular gap (66) and the throttle channels (77) form the minimum passage cross-section between the displacement chamber (61) and the compensation chamber (62) if the cylinder-piston unit (51) is loaded. The total area of this minimum passage cross-section is, for example, between 0.5% and 4% of the internal cross-sectional area ( ) of the cylinder (54). The sliding door leaf (12) is braked. At the same time, the tension spring (101) is relieved of load.

As the sliding door left (12) continues to decelerate, the volume flow in the cylinder-piston unit (51) from the displacement chamber (61) to the compensation chamber (62) is reduced. At the same time, the pressure of the oil (67) in the displacement chamber (61) decreases. The piston disk (91) is relieved of load and deforms back in the direction of its initial position. Such deformation back is assisted, for example, by the oil (67) flowing through the throttle channel (77), which loads the end face (92) of the piston disk (91) turned towards the piston end side (73) on the displacement chamber side. The piston disk (91) deforms almost abruptly back to its initial position. It now rests only on the elevations (81). A passage gap (68) is formed along the circumferential surface (94) of the piston disk (91) between the piston disk (91) and the piston end side (73) on the displacement chamber side. The cross-sectional area of such passage gap (68) is, for example, greater than or equal to the sum of all cross-sectional areas of the longitudinal apertures (75). Thus, the throttling effect of the piston disk (91) is virtually eliminated. The total passage cross-section is now, for example, 13.3% of the inner cylinder wall cross-sectional area. Such maximum passage cross-section can amount to between 10% and 15% of the internal cross-sectional area of the cylinder (54). Thus, the maximum passage cross-section is formed by the sum of the cross-sectional area of the annular gap (66) and the areas of all longitudinal apertures (75) in the same plane.

The remaining stroke of the drive element (41) in the direction of the end position (32) is, for example, a quarter of its total stroke at this point. At this point in time, for example, the tension spring (101) acts with the sum of its minimum tension force and a quarter of the difference between the maximum tension force and the minimum tension force. Such residual tension force of the tension spring (101) is greater than the amount of the sum of such static frictional force of the sliding door leaf (12) in the guide rail (15) and the resistance of the unloaded cylinder-piston unit (51). In the exemplary embodiment, the residual tension force of the tension spring (101) at such point is 28 newtons, while the sum of the oppositely directed forces is 9 newtons. Thereby, the tension spring (101) is designed to have a tension force at the specified residual stroke of a quarter of the total stroke, which is between 1.5 and 3.5 times greater than the amount of the sum of the oppositely acting forces. The tension spring (101) pulls the sliding door leaf (12) evenly into the closed end position, wherein the residual tension force decreases. Thereby, the maximum passage cross-section between the displacement chamber (61) and the compensation chamber (62) is maintained. The tension force of the tension spring (101) at the minimum effective length is, for example, twice the amount of the resistances.

If, for example, the operator manually displaces the sliding door leaf (12) more strongly in the closing direction (6) in this region, the pressure in the displacement chamber (61) of the cylinder-piston unit (51) increases again. The piston disk (91) again rests against the piston end side (73) on the displacement chamber side. The cylinder-piston unit (51) decelerates the sliding door leaf (12) until it reaches a speed in a transition region. As the pressure in the displacement chamber (61) decreases, the piston disk (91) deforms back to its initial position. The further relaxing tension spring (101) pulls the sliding door leaf (12) into the closed end position.

When the sliding door leaf (12) is pushed shut quickly, for example at speeds of up to 75 millimeters per second, the sliding door leaf (12) experiences a greater deceleration. The sliding door leaf can be braked to a standstill, for example. When the pressure in the displacement chamber (61) decreases, the piston disk (91) elastically deforms back. In such a case, the tension spring (101) also pulls the sliding door leaf (12) uniformly into the end position.

When the sliding door leaf (12) opens, the operator pulls the feed device (30) relative to the catch (21). The tension spring (101) is tensioned. The cylinder-piston unit (51) is extended. Thereby, the forces to be overcome by the operator are the sum of the spring force, the greater of the static frictional force and the rolling frictional force of the sliding door leaf (12) and the resistance of the cylinder-piston unit (51) at the maximum passage cross-section. Thus, the maximum opening force to be applied by the operator is the sum of the tension force of the tension spring (101) at the maximum effective length and the specified resistances. Due to the weak tension spring (101), such force to be applied by the operator is low in the exemplary embodiment. The tension force of the tension spring (101) at the maximum effective length can amount to between 1.5 and 3.5 times the tension force at the minimum effective length.

When the sliding door leaf (12) is opened, the drive element (41) is moved to the parking position. It remains there. When the sliding door leaf (12) is opened further, the catch (21) is disengaged from the drive element (41). The sliding door leaf (12) can now be opened further with almost no resistance.

Figure 8:
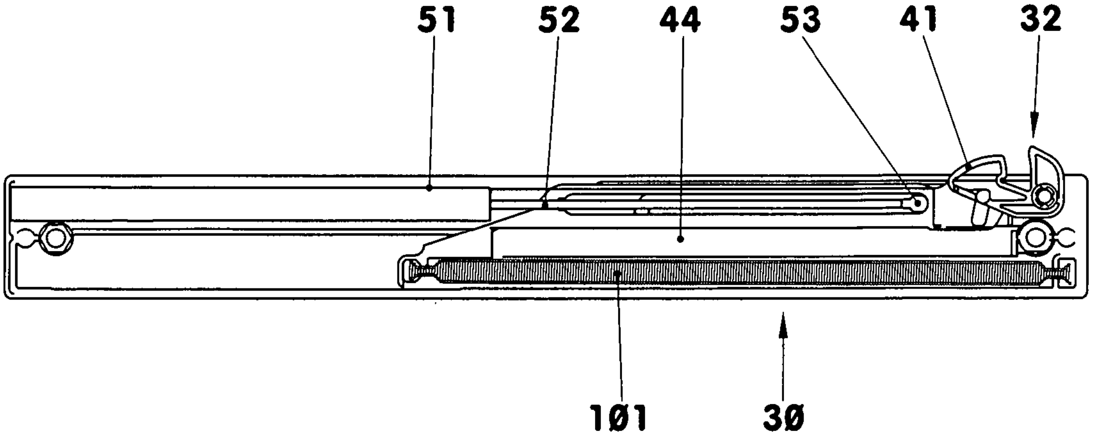
FIG. 8: Variant of the feed device.

FIG. 8 shows an additional embodiment of a feed device (30). In such feed device (30), the drive element (41) is coupled to a carriage (44) on which the piston rod head (53) of the cylinder-piston unit (51) is mounted. In the cylinder-piston unit (51) used here, the displacement chamber (61) is arranged between the cylinder head (58) and the piston (71). The compensation chamber (62) is located between the piston (71) and the cylinder base (55). For example, the piston (71), the cylinder (54) and the piston disk (91) have the same main dimensions and are made of the same materials as the components mentioned in connection with the first exemplary embodiment.

The spring energy store (101), which is designed as a tension spring (101), is arranged between the carriage (44) and the housing (31). In this tension spring (101), the minimum effective length is twice the length of the relaxed tension spring (101). The maximum effective length is 1.5 times the minimum effective length. In this exemplary embodiment, the tension force of the tension spring (101) at the maximum effective length is twice the tension force of the tension spring (101) at the minimum effective length. The latter tension force is, for example, 15 newtons.

The operation of a sliding door system (10) with the feed device (30) shown in FIG. 8 is as described in connection with the first exemplary embodiment. When the sliding door leaf (12) is closed, it is decelerated. When the pressure in the displacement chamber (61) decreases, the piston disk (91)

opens the longitudinal apertures (75) completely. The tension force of the tension spring (101) has decreased during the stroke of the drive element (41). For example, with a residual stroke of a quarter of the total stroke, the spring force is twice the amount of the resistances. Moreover, in such exemplary embodiment, the tension spring (101) pulls the sliding door leaf (12) into the closed end position.

The sliding door leaf (12) is opened as described above. In this exemplary embodiment, the maximum opening force is 2.6 times the tension force of the tension spring (101) at the minimum effective length.

The tension spring (101) can have a degressive characteristic. For example, the region between the minimum effective length and the tension spring (101) extended by a quarter of the effective stroke can be linear. If the tension spring (101) extends further, this can take place by means of an only slightly increasing force. Thus, the opening force to be applied by the operator can be further reduced.

It is also conceivable to decouple the tension spring (101) in a partial stroke of the total stroke from the drive element (41). For example, when the sliding door leaf (12) is opened, the tension spring (101) can be disengaged at a quarter of the stroke of the drive element (41). When the drive element (41) is moved further in the direction of the parking position, only the cylinder-piston unit (51) is then extended. The operator then only has to overcome the greater force of the static and/or rolling frictional force of the sliding door leaf (12) and the resistance of the cylinder-piston unit (51).

When the sliding door leaf (12) is closed, the tension spring (101) is then re-engaged and pulls the sliding door leaf (12) into the closed end position after the passage cross-section between the displacement chamber (61) and the compensation chamber (62) has increased.

Combinations of the individual exemplary embodiments are also conceivable.

LIST OF REFERENCE SIGNS

1 Surrounding area
2 Body
3 Door opening
4 Wall recess
5 Longitudinal direction
6 Closing direction
10 Sliding door system
11 Door frame
12 Sliding door leaf
13 Roller shoes
14 Rollers
15 Door guide rail
21 Catch
30 Feed device
31 Housing
32 End position
33 Longitudinal slot
34 Transverse apertures
35 Rear side of housing
41 Drive element
42 Receiving opening
43 Piston rod holder
44 Carriage
51 Cylinder-piston unit, deceleration device
52 Piston rod
53 Piston rod head
54 Cylinder
55 Cylinder base
56 Cylinder interior
57 Compensating sealing element
58 Cylinder head
59 Cylinder head cover
61 Displacement chamber
62 Compensation chamber
63 Return spring, compression spring
64 Extension direction
65 Inner cylinder wall
66 Annular gap
67 Oil
68 Passage gap
71 Piston
72 Shell surface
73 Piston end side, displacement chamber side
74 Piston end side, compensation chamber side
75 Longitudinal apertures
76 Piston pin
77 Throttle channel
78 Base surface
79 Side walls
81 Elevation
82 Flat surface section
91 Piston disk
92 End faces
93 Bore
94 Circumferential surface
101 Spring energy store, tension spring

The invention claimed is:

1. A sliding door system (10), comprising:

a door frame (11);

a sliding door leaf (12) that can move relative to the door frame (11) between an open end position and a closed end position along a door guide rail (15);

a catch (21), arranged either on the door frame (11) or on the sliding door leaf (12);

a drive element (41) of a feed device (30), the drive element (41) being arranged on the door frame (11) if the catch is arranged on the sliding door leaf (12) and the drive element (41) being arranged on the sliding door leaf (12) if the catch is arranged on the door frame (11), wherein the catch (21) can be coupled to the drive element (41) in a partial stroke range of the sliding door leaf (12) adjacent to one of the open end position or the closed end position, so that the feed device (30) moves the sliding door leaf (12) relative to the door frame (11) into the respective open end position or closed end position, wherein the feed device (30) has an acceleration device formed as a tension spring (101) and a deceleration device (51) formed as a cylinder-piston unit (51), wherein the cylinder-piston unit (51) has a piston (71) that can move relative to a cylinder (54) and separates a displacement chamber (61) from a compensation chamber (62), and wherein a passage cross-section between the displacement chamber (61) and the compensation chamber (62) can be changed in a load-dependent manner by a piston disk (91) that can be applied against a piston end side (73) on a displacement chamber side, wherein a minimum passage cross-section is between 0.5 percent and 4 percent of an internal cross-sectional area of the cylinder (54), wherein a maximum passage cross-section is between 10% and 15% of the internal cross-sectional area of the cylinder (54), wherein the tension spring (101) has a tension force at a maximum effective length that is between twice and three times the tension force at a minimum effective length, and wherein the tension force of the tension spring (101) is between 1.5 times and 3.5 times a sum of a static frictional force of the sliding door leaf (12) and a resistance of the cylinder-piston unit (51) with the maximum passage cross-section when the tension spring (101) is extended by a quarter of an effective stroke of the tension spring (101) beyond the minimum effective length.

2. The sliding door system (10) according to claim 1, wherein the piston (71) is surrounded by an annular gap (66).

3. The sliding door system (10) according to claim 1, wherein the piston disk (91) is designed to be bendable.

4. The sliding door system (10) according to claim 1, wherein a thickness of the piston disk (91) is a maximum of 5% of an inner diameter of the cylinder (54) and wherein a modulus of elasticity of the piston disk (91) is less than 3500 MPa.

5. The sliding door system (10) according to claim 1, wherein the piston end side (73) turned towards the piston disk (91) on the displacement chamber side is designed to be uneven.

6. The sliding door system (10) according to claim 5, wherein the piston end side (73) on the displacement chamber side has a flat surface section (82) from which at least one elevation (81) oriented towards the piston disk (91) projects.

7. The sliding door system (10) according to claim 5, wherein the piston (71) has longitudinal apertures (75), wherein each longitudinal aperture (75) is connected to the displacement chamber (61) by an unclosable throttle channel (77).

8. The sliding door system (10) according to claim 7, wherein each unclosable throttle channel (77) of the piston (71) is stamped into the piston end side (73) on the displacement chamber side and connects one of the longitudinal apertures (75) to a piston shell surface (72).

9. The sliding door system (10) according to claim 1, wherein the tension force of the tension spring (101) at the minimum effective length is greater than the sum of the static frictional force of the sliding door leaf (12) and the resistance of the cylinder-piston unit (51) at the maximum passage cross-section, wherein such tension force is a maximum of 2.5 times the sum.

* * * * *